B. Seguine.
Cotton Cleaner.

N°3,154.          Patented Jul. 3, 1843.

Inventor
Bent Seguine

UNITED STATES PATENT OFFICE.

BORNT SEGUINE, OF ALEXANDRIA, LOUISIANA.

MACHINE FOR CLEANING COTTON BEFORE GINNING.

Specification of Letters Patent No. 3,154, dated July 3, 1843.

*To all whom it may concern:*

Be it known that I, BORNT SEGUINE, of Alexandria, in the parish of Rapides, in the State of Louisiana, have invented a new and useful Improvement in Cleaning Cotton Before Ginning; and I do hereby declare that the following is a full, clear, and exact description thereof, reference being had to the accompanying drawing, which forms a part of this specification, in which—

Figure 1:
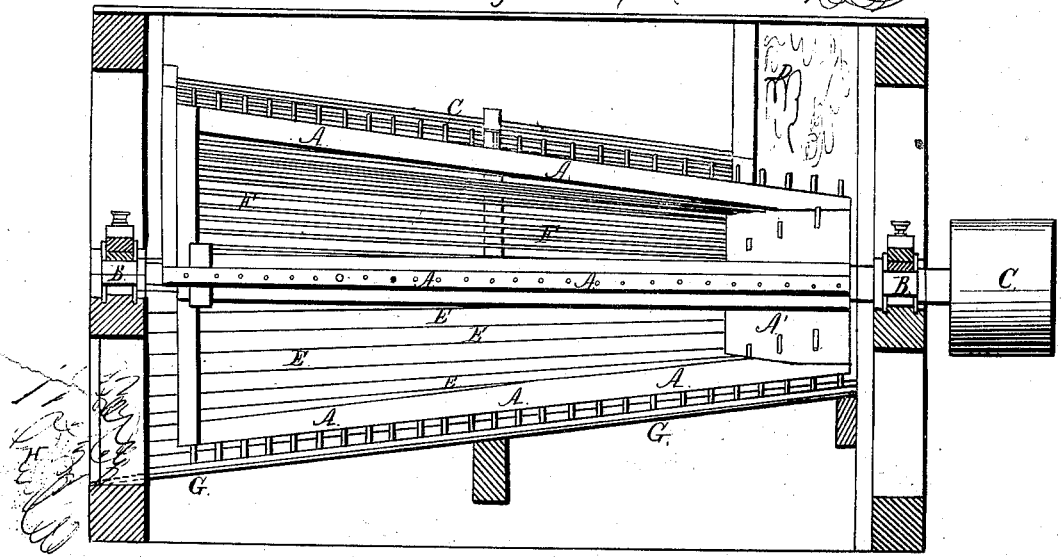
Figure 2:
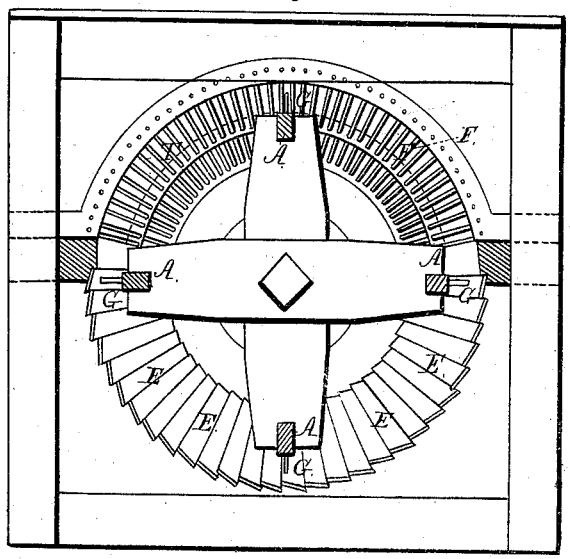

Figure 1, is a vertical longitudinal section; Fig. 2, a cross section or end view.

The nature of my invention consists in constructing a machine that will clean all the dust and dirt from cotton after it is picked, before it is put into the gin by which means less care is required in picking and a more perfect article is produced; the cotton being less liable to nap in passing through the gin.

In a suitable frame a horizontal shaft B is sustained; from near one end of this shaft four arms are projected radially within the frame; at the other end a block A′ somewhat conical in form is fixed, the frustum being toward the arms, and the diameter of the largest end being much less than that of the arms above named. From the outer end of each of the arms a rail A extends to the block A′ where the other end is fastened; these rails or beater staves are armed with a row of teeth G their whole length and projecting outward; the block A′ is also set around with teeth spirally between the arms A.

Around the beater or runner as above described there is a conical case, that entirely incloses its sides; at the small end there is a tight head, and on the upper side just over the block A′ there is an aperture over which a hopper is set through which the cotton D, is fed into the machine. After passing through the beaters and having the dirt extracted it makes its exit at the other end, the lower half of the case being open then as shown at H. The beater is driven by a pulley C, on its shaft outside the frame by a band leading from any driving power. The case inclosing the beaters is of a conical form to correspond with the outline of the beater; its lower half is formed of thin flat slats E, one edge of each slat being made to project inward and giving the case somewhat the appearance of a venitian blind without having the slats overlap each other. The other or upper half of the case is composed of a grating of round rods F through which the dust can be driven, the rods lying nearly parallel to each other. A machine thus constructed will free the cotton from dust and dirt, so as to present as perfect an appearance as clean picked cotton.

What I claim as my invention and desire to secure by Letters Patent is—

Making the casing for the conical beaters with the lower half inclosed with flat bars or slats one of the edges of each of which project inward so as to bring the cotton in contact with that edge; and in combination therewith the upper half made with round bars or grating for the escape of dirt, constructed substantially in the manner and for the purpose herein described.

BORNT SEGUINE.

Witnesses:
J. J. GREENOUGH,
JOHN HITZ.